WILLIAM F. DUERR, OF NEWARK, NEW JERSEY, ASSIGNOR TO HIMSELF AND REUBEN D. BALDWIN, OF SAME PLACE.

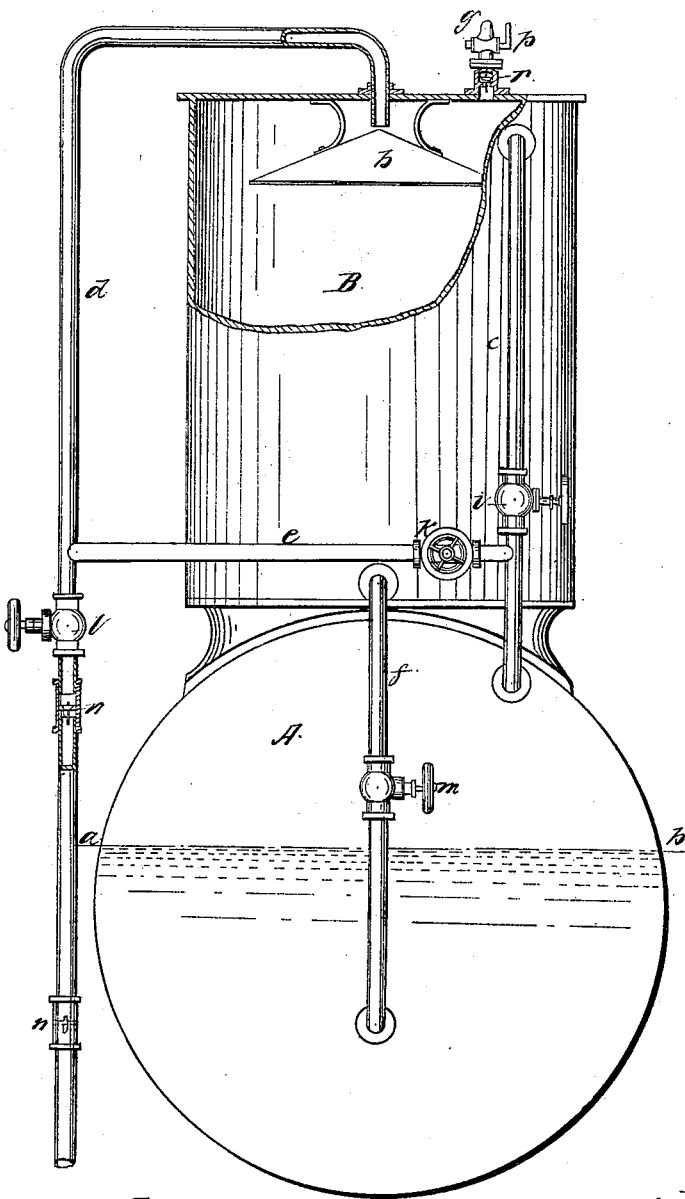

Letters Patent No. 89,208, dated April 20, 1869.

IMPROVEMENT IN FEED-WATER DEVICE FOR BOILERS.

The Schedule referred to in these Letters Patent and making part of the same.

*To all whom it may concern:*

Be it known that I, WILLIAM F. DUERR, of Newark, in the county of Essex, and State of New Jersey, have invented certain new and useful Improvements in Boiler-Feeders; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to the feeding of water into the boilers of steam-engines, or any boiler in which steam is to be generated; and It consists in a novel arrangement of a receiver or condensing-vessel, and a series of pipes, whereby the water is elevated to the receiver, and from thence fed into the boiler, without the use of a pump, or similar device, as hereinafter explained.

Figure 1 represents an elevation of my improved feeder, with the receiver mounted upon the boiler.

A represents an ordinary steam-generator, upon which is mounted a reservoir, B, which is closed and made steam-tight, and sufficiently strong to stand a pressure equal to that of the boiler.

From the well, or source of supply, a pipe leads to and enters the top of the reservoir B, this pipe being provided with one or more check-valves $n$, and a stop-valve or cock $l$, as represented in the drawings.

Where this pipe enters the reservoir B it terminates just over a conical plate, $h$, which serves to distribute the water as it issues from the mouth of the pipe, and causes it to fall in a shower; or the cone $h$ may be perforated, if desired, for the purpose of more effectually showering the water into the reservoir.

Another pipe, $c$, is connected, at one end, to the boiler A, near the top, in the steam-space, and from thence extends upward, and enters the reservoir, near its top, as shown in the drawing.

A branch-pipe, $e$, connecting this pipe $c$ with the water-supply pipe $d$, above the cock $l$, both pipes $c$ and $e$ being provided with stop-cocks also.

Another pipe, $f$, is connected, at its upper end, to the lower part of the reservoir B, and, extending downward, has its lower end entering the boiler below the water-line, this pipe, $f$, being also provided with a stop-cock, $m$, as shown.

A small tube or pipe, $g$, extends from the top of the reservoir, and opens into the air, it being provided with a check-valve, $r$, and a stop-cock, $p$, as represented in the drawing.

The apparatus, being thus constructed, is used as follows:

By opening the cock $i$, steam passes from the boiler into the reservoir B, the cock $p$, at the top, being opened, to permit the air in the reservoir to be driven out.

When the reservoir is filled with steam, the cocks $p$ and $i$ are closed, and the cock $k$, in pipe $e$, opened, which permits the steam to flow into pipe $d$, thereby forcing the water, which is above cock $l$, in pipe $d$, over into the reservoir; and as this water descends through the steam therein, the steam is condensed, creating a vacuum in the reservoir.

The instant this is done, the cock $k$ should be shut, and cock $l$ opened, when the water will flow up the pipe $d$ until the reservoir is nearly filled, the quantity, of course, depending upon the height that it has to be raised, and the perfection of the vacuum in the reservoir.

When this is done, the cock $l$ is closed, and the steam-cock is opened, which latter operation permits the steam to pass from the boiler into the reservoir, thus equalizing the pressure in the two.

This being done, it is only necessary to open cock $m$ in pipe $f$, and the water will flow from the reservoir into the boiler, the supply, of course, being regulated by the cock $m$.

The check-valves $n$ will prevent the return of the water, or the escape of steam down the pipe $d$, while the check-valve $r$ will prevent the return of air into the reservoir.

It will be necessary, in the first instance, to fill the pipe $d$ with water, which may be done by any suitable means.

By making the reservoir of sufficient size, the operation of refilling will only be required occasionally. The pipe $e$ may be omitted, but in that case considerable time will be required to condense the steam sufficiently to create a vacuum, so as to cause the water to flow in through pipe $d$.

Having thus described my invention,

What I claim, is—

A boiler-feeding apparatus, constructed and arranged to operate substantially as herein described.

WM. F. DUERR.

Witnesses:
HORACE HARRIS,
S. W. CLARK.